(12) United States Patent
Mortensen et al.

(10) Patent No.: US 11,213,794 B2
(45) Date of Patent: Jan. 4, 2022

(54) CO RICH SYNTHESIS GAS PRODUCTION

(71) Applicant: HALDOR TOPSØE A/S, Kgs. Lyngby (DK)

(72) Inventors: Peter Mølgaard Mortensen, Roskilde (DK); Martin Østberg, Tune (DK); Per Juul Dahl, Vedbæk (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 251 days.

(21) Appl. No.: 16/308,677

(22) PCT Filed: Jun. 7, 2017

(86) PCT No.: PCT/EP2017/063826
§ 371 (c)(1),
(2) Date: Dec. 10, 2018

(87) PCT Pub. No.: WO2017/211884
PCT Pub. Date: Dec. 14, 2017

(65) Prior Publication Data
US 2019/0151813 A1    May 23, 2019

(30) Foreign Application Priority Data

Jun. 10, 2016 (DK) ............................ PA 2016 00343
Sep. 16, 2016 (DK) ............................ PA 2016 00543

(51) Int. Cl.
*B01J 8/04* (2006.01)
*B01J 8/06* (2006.01)
(Continued)

(52) U.S. Cl.
CPC ........... *B01J 8/0496* (2013.01); *B01J 8/0278* (2013.01); *B01J 8/0484* (2013.01); *B01J 8/0492* (2013.01);
(Continued)

(58) Field of Classification Search
CPC ...................................................... B01J 8/0496
(Continued)

(56) References Cited

U.S. PATENT DOCUMENTS 4,882,521 A    11/1989  Arimoto
5,202,057 A *   4/1993  Nicholas ............. C01B 21/0494
                                                        252/376
(Continued)

FOREIGN PATENT DOCUMENTS

EP        0437059 A2    7/1991
EP        1245532 A2    10/2002
(Continued)

OTHER PUBLICATIONS

International Search Report (PCT/ISA/210) dated Aug. 23, 2017, by the European Patent Office as the International Searching Authority for International Application No. PCT/EP2017/063826.
(Continued)

*Primary Examiner* — Douglas B Call
(74) *Attorney, Agent, or Firm* — Buchanan Ingersoll & Rooney P.C.

(57) ABSTRACT

The invention relates to a chemical reactor and reformer tubes for reforming a first feed stream comprising a hydrocarbon gas and steam. The chemical reactor comprises a shell with a heat source and one or more reformer tubes. The reformer tube is arranged to house catalyst material and is arranged to being heated by the heat source. The reformer tube comprises a first inlet for feeding said first feed stream into a first reforming reaction zone of the reformer tube, and a feed conduct arranged to allow a second feed stream into a second reforming reaction zone of the reformer tube. The second reforming reaction zone is positioned downstream of the first reforming reaction zone. The feed conduct is configured so that the second feed stream is only in contact
(Continued)

with catalyst material in the second reforming reaction zone. The invention also relates to a process of producing CO rich synthesis gas at low S/C conditions.

7 Claims, 8 Drawing Sheets

(51) Int. Cl.
  *C10K 3/02*    (2006.01)
  *B01J 19/00*   (2006.01)
  *C01B 3/48*    (2006.01)
  *C01B 3/38*    (2006.01)
  *B01J 8/02*    (2006.01)

(52) U.S. Cl.
  CPC ............ *B01J 8/062* (2013.01); *B01J 8/065* (2013.01); *B01J 8/067* (2013.01); *B01J 19/006* (2013.01); *C01B 3/382* (2013.01); *C01B 3/384* (2013.01); *C01B 3/48* (2013.01); *C10K 3/026* (2013.01); *B01J 2208/0053* (2013.01); *B01J 2208/00309* (2013.01); *B01J 2208/00318* (2013.01); *B01J 2208/00504* (2013.01); *B01J 2208/00902* (2013.01); *B01J 2208/065* (2013.01); *C01B 2203/0233* (2013.01); *C01B 2203/0238* (2013.01); *C01B 2203/0283* (2013.01); *C01B 2203/0445* (2013.01); *C01B 2203/0816* (2013.01); *C01B 2203/0844* (2013.01); *C01B 2203/1235* (2013.01); *C01B 2203/1241* (2013.01); *C01B 2203/142* (2013.01); *C10G 2300/104* (2013.01); *C10G 2300/1044* (2013.01); *C10G 2300/305* (2013.01); *C10G 2300/4037* (2013.01); *C10G 2400/02* (2013.01)

(58) Field of Classification Search
  USPC ........................................................ 252/373
  See application file for complete search history.

(56) References Cited

U.S. PATENT DOCUMENTS

| | | | |
|---|---|---|---|
| 6,527,980 | B1 | 3/2003 | Roden et al. |
| 2003/0198592 | A1 | 10/2003 | Allison et al. |
| 2009/0123348 | A1 | 5/2009 | Brady et al. |
| 2013/0058855 | A1* | 3/2013 | Toppinen ............... C01B 3/386 423/245.1 |
| 2016/0023898 | A1* | 1/2016 | Morgenstern ......... B01J 8/0438 48/61 |

FOREIGN PATENT DOCUMENTS

| | | | |
|---|---|---|---|
| EP | 1403215 | A1 | 3/2004 |
| EP | 2522624 | A1 | 11/2012 |
| EP | 2565155 | A1 | 3/2013 |
| GB | 1059957 | A | 2/1967 |
| JP | S62186933 | | 8/1987 |
| WO | 2008147860 | A1 | 12/2008 |
| WO | WO2013149118 | * | 10/2013 |
| WO | 2014180888 | A1 | 11/2014 |
| WO | 2015091310 | A1 | 6/2015 |

OTHER PUBLICATIONS

Written Opinion (PCT/ISA/237) dated Aug. 23, 2017, by the European Patent Office as the International Searching Authority for International Application No. PCT/EP2017/063826.

Search Report for Danish Application No. PA 2016 00343 dated Jan. 12, 2017.

Search Report for Danish Application No. PA 2016 00543 dated Mar. 2, 2017.

Mortensen, P. M. et al."Industrial scale experience on steam reforming of CO2-rich gas" Applied Catalysis A: General, vol. 495, 2015, pp. 141-151.

* cited by examiner

CO RICH SYNTHESIS GAS PRODUCTION

FIELD OF THE INVENTION

Embodiments of the invention generally relate to a chemical reactor for reforming of a first feed stream comprising a hydrocarbon gas and steam and a reformer tube of such a chemical reactor. Other embodiments of the invention relate to a process of reforming a first feed stream comprising a hydrocarbon gas and steam in a chemical reactor and a plant for reforming a first feed stream comprising a hydrocarbon gas and steam. In particular, the invention relates to a reforming process aimed at producing a reformed stream with a low $H_2/CO$ ratio.

BACKGROUND

Catalytic synthesis gas production from a hydrocarbon feed stream has been known for decades. It is also known that carbon formation on the catalyst used is a challenge, especially for production of synthesis gasses with a relatively low $H_2/CO$ ratio. Therefore, catalysts resistant to carbon formation are required. Such carbon resistant catalysts are e.g. noble metal catalysts, partly passivated nickel catalysts, and promoted nickel catalysts. Moreover, industrial scale reforming of $CO_2$ rich gas typically requires a co-feed of water to decrease the severity of the gas for carbon formation. Alternatively, a sulfur passivated reforming (SPARG) process may be used for producing synthesis gas with a relatively low $H_2/CO$ ratio. See e.g. "Industrial scale experience on steam reforming of $CO_2$-rich gas", P. M. Mortensen & I. Dybkjær, Applied Catalysis A: General 495 (2016), 141-151.

SUMMARY OF THE INVENTION

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the invention generally relate to reforming of a hydrocarbon feed stream in reforming reaction zones within the tubes of a reforming reactor. The term "reforming reaction zone" is meant to denote a catalytic zone of the reactor, where the steam methane reforming reaction takes place. Typically, dry methane reforming reaction, and water gas shift reactions also take place in the reforming reaction zone.

One embodiment of the invention provides a chemical reactor for carrying out reforming of a first feed stream comprising a hydrocarbon gas and steam. The chemical reactor comprises a shell comprising a heat source, and a reformer tube arranged to house catalyst material. The reformer tube is placed within the shell and is arranged to being heated by the heat source. The reformer tube comprises a first inlet for feeding the first feed stream into a first reforming reaction zone of the reformer tube, and a feed conduct arranged to conduct a second feed stream in heat exchange contact with the catalyst material housed within the reformer tube and to allow the second feed stream into a second reforming reaction zone of the reformer tube, where the second reforming reaction zone is positioned downstream of the first reforming reaction zone, and wherein the feed conduct is configured so that the second feed stream is only in contact with catalyst material in the second reforming reaction zone.

Hereby, it is rendered possible to add the second feed stream into the reactor at a position where the first feed stream has already been at least partly reformed. Typically, the catalyst material within the reformer tube is a reforming catalyst material. Typically, the first and the second reforming reaction zones contain the same type of catalyst material. The catalyst material is advantageously a catalyst material arranged for catalyzing the steam methane reforming reaction. Preferably, the catalyst material is suitable for catalyzing both the steam methane reforming, the dry methane reforming and the water gas shift reactions. The terms "catalyst" and "catalyst material" are used interchangeably herein.

The term "hydrocarbon gas" is meant to denote a gas stream comprising one or more hydrocarbon gasses, and possibly other gasses. For reforming processes, an example of a "first feed stream comprising a hydrocarbon gas and steam" is e.g. a mixture of methane, steam, and possibly other oxidizing gasses, such as carbon dioxide, oxygen, or mixtures thereof. Examples of "a hydrocarbon gas" may be natural gas, town gas, or a mixture of methane and higher hydrocarbons. The term "second feed stream" is meant to denote another stream different from the "first feed stream". Thus, the second feed stream may be any appropriate gas stream suitable for supporting the reforming reaction within a reforming reactor and/or for assisting the provision of a CO rich synthesis gas, typically $CO_2$ rich gasses comprising at least 50% dry mol $CO_2$. The term "downstream" as used in this text is meant to denote at "a later point or position in a process or system", whilst the term "upstream" is meant to denote "at an earlier point or position in a process or system". In a case where the term "downstream" or "upstream" is used in relation to the reformer tube, which may conduct both a first and a second feed stream, these terms are meant to be in relation to the flow direction of first feed stream, unless otherwise specified.

The term "first reforming reaction zone" is meant to denote the part of the catalyst filled reactor tube extending from the first inlet to the second reforming reaction zone, downstream of the first reforming reaction zone. The term "second reforming reaction zone" is meant to denote the part of the catalyst filled reactor tube from the point of inletting the second feed stream into the reformer tube. This point is here denoted "an addition point" or "an addition zone" in the case where the second feed gas is added at more than one point of the flow direction of the first feed stream along the chemical reactor.

The second reforming reaction zone thus comprises an addition point or an addition zone at/along which the second feed stream is inlet from the feed conduct into the catalyst filled reformer tube. The addition point may be longitudinal in the case where a number of inlets from the feed conduct into the reformer tube exists or in the case where a frit material extending along at least a part of the longitudinal axis of the reformer tube is arranged to inlet the second feed stream into the addition zone. When the addition zone has a relatively short longitudinal extent, e.g. if the additional zone is at a point only along the longitudinal axis of the reformer tube, it is denoted "addition point". Optionally, the second reforming section also comprises catalyst filled zone downstream the addition point/addition zone, in which no further second feed stream (or other feed stream) is added. This is denoted a third reforming reaction zone. Alternatively, the addition zone extends along all of the second reforming reaction zone. In this case, no third reforming reaction zone exists.

The term "the second feed stream is only in contact with catalyst material in the second reforming reaction zone" is meant to denote, that the second feed stream is inlet into the catalyst filled part of reformer tube at the addition point or the most upstream part of the addition zone. Even though the second feed stream has heat exchange contact with the first reforming reaction zone through the wall(s) of the feed conduct, there is not fluid or physical contact between the second feed stream and the catalyst material until the second feed stream has entered into the second reforming reaction zone. Thus, the second feed stream is not in fluid contact or physical contact with catalyst material within the first reforming reaction zone.

The feed conduct is configured so that the second feed stream is kept separate from the first feed stream, so that the second feed stream does not contact the catalyst material within the reformer tube until the second reforming reaction zone. Typically, the first feed stream and the second feed stream are streams of different composition.

In summary, the catalyst filled part of the reformer tube contains a first and a second reforming reaction zone, where the second reforming reaction zone is downstream the first reforming reaction zone. The second reforming reaction zone has an addition zone or addition point, where the second feed stream is inlet into reformer tube, reaching the catalyst material and being mixed with a partly reformed first feed stream. The second reforming reaction zone may comprise a third reforming reaction zone downstream the addition point/addition zone. No further stream is added in the third reforming reaction zone. Each of the reforming reaction zones comprises catalyst material arranged to catalyze a reforming reaction. The feed conduct typically does not comprise any catalyst.

As seen along the direction of the first gas stream along the reformer tube, the first reforming reaction zone is the most upstream zone out of the first and second reforming reaction zones. Within the second reforming reaction, the addition point or addition zone is meant the most upstream part followed by the optional third reforming reaction zone. Typically, the first reforming reaction zone extends from the inlet of the first feed stream or from the most upstream part of the catalyst material within the reformer tube, and the second reforming reaction zone extends from the first reforming reaction zone to an outlet for reformed gas from the reformer tube, or to the most downstream part of the catalyst material within the reformer tube.

It should be understood that the term "an inlet" and "an outlet" is not intended to be limiting. Thus, these terms also cover the possibility where the units, e.g. the reformer tube, have more than one inlet and/or outlet. For example, a reformer tube could have an inlet for hydrocarbon gas and another inlet for steam, so that the hydrocarbon gas and steam is mixed within the reformer tube.

In an embodiment, the feed conduct comprises a first part arranged for conducting the second feed stream in heat exchange contact with catalyst material housed within the reformer tube, and a second part arranged for inletting the second feed stream into the second reforming reaction zone of the reformer tube. Typically, the second feed stream within the feed conduct is heated by heat exchange between the feed conduct and the first reforming reaction zone upstream the second reforming reaction zone, prior to being inlet into the second reforming reaction zone. Alternatively, the second feed stream may be led along the second reforming reaction zone, in heat exchange contact with the catalyst material therein. The second part of the feed conduct may be relatively small, for example in case of only inlets into one point along the longitudinal axis of the reformer tube, or the second part of the feed conduct may be elongate in case of inlets at more than one point along the longitudinal axis of the reformer tube.

In an embodiment, the feed conduct extends into the second reforming reaction zone and the feed conduct comprises a baffle arranged to conduct the second feed stream in heat exchange contact with the second reforming reaction zone prior to allowing the second feed stream into the second reforming reaction zone via the second part. Due to heat source(s) of the chemical reactor, the temperature of the catalyst material within the reformer tube increases along the length of the chemical reactor. The temperature is thus higher in the second reforming reaction zone than in the first reforming reaction zone. Therefore, when the second feed stream is led in heat exchange contact with catalyst material within the second reforming reaction zone, the temperature thereof is higher than if the second feed stream had only had heat exchange contact with the first reforming reaction zone. When the temperature of the second feed stream is increased, the risk of carbon formation in the addition point is reduced. Thus, the overall operation of the chemical reactor is improved. The feed conduct arranged for housing the second feed stream may advantageously extend substantially along the length of the reformer tube.

In an embodiment, the feed conduct extends within the reformer tube from a first and/or a second end of the reformer tube to the second reforming reaction zone. Thus, the feed conduct may be a tube extending within the reformer tube, e.g. along or parallel to the longitudinal axis thereof, from one of the ends of the reformer tube. As used herein, the reformer tube is seen as a tube extending from a first end along a longitudinal axis to a second end. Alternatively, an inner feed conduct having inlets into the second reforming reaction zone may extend within the reformer tube from the first to the second end thereof.

In an embodiment, the second part comprises second inlet(s) at one or more points along the longitudinal axis of the reformer tube and/or a frit material extending along at least a part of the longitudinal axis for letting the second feed stream be released into the second reforming reaction zone along at least a part of the longitudinal axis of the reformer tube housing the feed conduct. Thus, the second feed stream may be inlet, via one or more inlets, at a single distance along the longitudinal axis of the reformer tube, or via more than one inlet at different distances along the longitudinal axis. Additionally, or alternatively, the second part comprises a frit material allowing the second feed stream to pass through the frit material over a certain extent along the longitudinal axis. Throughout this text, the term "frit material" is meant to denote a porous material or a material with a plurality of holes through which a gas or liquid may pass. By use of a frit material instead of one or more inlets, the second feed stream may be added into the second reforming reaction zone over a larger area thereof.

In an embodiment, the heat source is able to heat the catalyst material within the reformer tube to a maximum temperature of at least 750° C. Typically, the first feed stream is preheated to an inlet temperature prior to entering the reformer tube of between about 400° C. and 650° C. and a temperature before exiting the reformer tube of above 800° C., above 850° C. or even at or above 900° C. Moreover, the temperature of the catalyst material within the reformer tube at the point(s) of inletting the second feed stream into the second reforming reaction zone is e.g. above 800° C., e.g. at about 850° C. or about 900° C.

In an embodiment, the feed conduct is arranged to withstand temperatures at least up to 850° C. Typically, the pressure difference over the wall of the feed conduct is low, e.g. less than 1-2 bar, so that the materials which are able to withstand such temperatures and advantageously also conduct heat well will be suitable candidates.

In an embodiment, the chemical reactor further comprises heat exchange means for heating the second feed stream to a temperature of at least 700° C. Advantageously, the heat exchange means are arranged to heat the second feed stream to a temperature of about 800° C. prior to addition to the second reforming reaction zone. Such heat exchange means may comprise a separate heat exchanger arranged to heat the second feed stream upstream of the feed conduct and/or an arrangement so that heat is exchanged between the feed conduct and the first reforming reaction zone upstream the second reforming reaction zone.

Another embodiment relates to a reformer tube arranged to house catalyst material and to let the catalyst material be heated by an external heat source. The reformer tube material has a first inlet arranged to allow a first feed stream to be fed into a first reforming reaction zone of the reformer tube. The reformer tube comprises a feed conduct arranged to conduct a second feed stream in heat exchange contact with the catalyst material housed within the reformer tube and to allow the second feed stream into a second reforming reaction zone into the reformer tube, the second reforming reaction zone being positioned downstream of the first inlet. The feed conduct is configured so that the second feed stream is only in contact with catalyst material in the second reforming reaction zone, viz. in the addition zone and the optional third reforming reaction zone downstream the addition zone. Hereby, it is rendered possible to add the second feed stream into the reactor at a position where the hydrocarbons in the first feed stream has already been at least partly reformed. Typically, the catalyst material within the reformer tube is a reforming catalyst. Preferably, the catalyst material is suitable for catalyzing both the steam methane reforming, the dry methane reforming and the water gas shift reactions. Typically, the first and the second reforming reaction zones contain the same type of catalyst material.

In an embodiment, the feed conduct comprises a first part arranged for conducting the second feed stream along the first reforming reaction zone, and a second part arranged for inletting the second feed stream into the reformer tube. Typically, the feed conduct is heated by heat exchange between the feed conduct and the first reforming reaction zone upstream the second reforming reaction zone, prior to being inlet into the second reforming reaction zone.

In an embodiment, the feed conduct extends within the reformer tube from the first or the second end of the reformer tube to the second reforming reaction zone. Thus, the feed conduct may be a tube extending within the reformer tube, along or parallel to the longitudinal axis thereof, from one of the ends of the reformer tube. As used herein, the reformer tube is seen as a tube extending from a first end along a longitudinal axis to a second end. Alternatively, an inner tube having inlets into the second reforming reaction zone may extend within the reformer tube from the first to the second end thereof.

In an embodiment, the feed conduct extends into the second reforming reaction zone and the feed conduct comprises a baffle arranged to conduct the second feed stream in heat exchange contact with at least a part of the second reforming reaction zone prior to allowing the second feed stream into the second reforming reaction zone via the second part. When the second feed stream is conducted in heat exchange contact with some of the second reforming reaction zone prior to being inlet into the second reforming reaction zone, the temperature of the second feed stream is increased. The heat exchange may increase temperature of the second feed stream to a higher temperature than the catalyst material within the first reforming reaction zone; this reduces the risk of carbon formation in the addition point of the second feed stream to the second reforming reaction zone and improves the overall operation of the chemical reactor. For example, the feed conduct may extend along most of or substantially all of the length of the reformer tube, and the second feed stream may thus be in heat exchange with the most of or substantially all of the length of the second reforming reaction zone, including at least part of the optional third reforming zone.

In an embodiment, the feed conduct extends within the reformer tube, along the axis thereof, from a first and/or a second end of the reformer tube to the second reforming reaction zone. Thus, the feed conduct may be a tube extending within the reformer tube, along the longitudinal axis thereof, from one of the ends of the reformer tube. Alternatively, an inner feed conduct having inlets into the second reforming reaction zone may extend within the reformer tube from the first to the second end thereof.

In an embodiment, the second part has second inlet(s) at one or more points along a longitudinal axis of the reformer tube and/or comprises a frit material extending along at least a part the longitudinal axis for letting the second feed stream be released into the second reforming reaction zone along at least a part of the longitudinal axis of the reformer tube housing the feed conduct. Thus, the second feed stream may be inlet, via one or more inlets, at a single distance along the longitudinal axis of the reformer tube, or via more than one inlet at different distances along the longitudinal axis. Additionally, or alternatively, the second part comprises a frit material allowing the second feed stream to pass through the frit material over a certain extent along the longitudinal axis.

By use of a frit material instead of one or more inlets, the second feed stream may be added into the second reforming reaction zone over a larger area thereof.

According to another embodiment, the invention relates to a process of reforming a first feed stream in a chemical reactor. The process comprises the steps of:

a) heating a reformer tube comprising catalyst material, the reformer tube being placed within a shell of the chemical reactor, the shell housing a heat source for the heating, b) inletting the first feed stream into a first inlet into a reforming reaction of the reformer tube, c) carrying out reforming reaction of the first feed stream within the first reforming reaction zone, d) inletting a second feed stream into a feed conduct, wherein the feed conduct is configured so that the second feed stream is only in contact with catalyst material in the second reforming reaction zone, e) conducting the second feed stream in heat exchanges contact with catalyst material housed within the reformer tube and inletting the second feed stream into a second reforming reaction zone into the reformer tube, and f) carrying out reforming reaction of the first feed stream and the second feed stream within the second reforming reaction zone, wherein the second reforming reaction zone is positioned downstream of the first reforming reaction zone, where the second feed stream comprises at least 50 dry mol % $CO_2$ and where the second feed stream is heated prior to introduction thereof into the second reforming reaction zone of the reformer tube.

By the process the second feed stream is added into the reactor at a position where the first feed stream comprising a hydrocarbon gas and steam has already been at least partly reformed. This partly reformed first feed stream is thus mixed with the second feed stream. This mixing allows the elemental H/C and O/C ratios of the gas within the second reforming reaction zone to differ from the H/C and O/C ratios within the first reforming reaction zone. The composition of the second feed stream thus renders it possible to change the H/C and O/C ratios of the gas to a gas which would be considered critical with respect to carbon formation in a typical reformer configuration, without being critical in the concept of the invention.

Within this context, the term S/C or "S/C ratio" is an abbreviation for the steam-to-carbon ratio. The steam-to-carbon ratio is the ratio of moles of steam to moles of carbon in hydrocarbons in the reformer feed. Thus, S/C is the total number of moles of steam added divided by the total number of moles of carbon from the hydrocarbons in the feed. Moreover, the term "O/C" or "O/C ratio" is an abbreviation for the atomic oxygen-to-carbon ratio. The oxygen-to-carbon ratio is the ratio of moles of oxygen to moles of carbon in a gas. Furthermore, the term H/C or "H/C ratio" is an abbreviation for the atomic hydrogen-to-carbon ratio. The hydrogen-to-carbon ratio is the ratio of moles hydrogen to moles of carbon in a gas. It should be noted that the term "C" in the ratio S/C thus is different from the "C" in the ratios H/C and O/C, since in S/C "C" is from hydrocarbons only, whilst in O/C and H/C, "C" denotes all the carbon in the stream.

By heating the second feed prior to introduction thereof into the second reforming reaction zone of the reformer tube, the carbon formation area of the carbon limit diagram (or "Tøttrup diagram") (see FIG. 6) can be circumvented and a synthesis gas can be produced at more critical conditions than typical reforming. For example, the second feed stream is heated to about 800° C. prior to being added into the second reforming reaction zone.

When the second feed stream is a $CO_2$ rich gas, a CO rich synthesis gas is produced by the process of the invention, whilst alleviating problems of carbon formation on the catalyst material. Within this text the term "a $CO_2$ rich gas" is meant to denote a gas comprising at least 50 dry mol % $CO_2$.

Typically, the catalyst material within the reformer tube is a reforming catalyst. Advantageously, the catalyst material is arranged to catalyze steam methane reforming, dry methane reforming and water gas shift reactions. Typically, the first and the second reforming reaction zones contain the same type of catalyst material. Examples of catalyst materials could be $Ni/MgAl_2O_4$, $Ni/CaAl_2O_4$, $Ru/MgAl_2O_4$, $Rh/MgAl_2O_4$, $Ir/MgAl_2O_4$, $Mo_2C$, $Wo_2C$, $CeO_2$, but other catalysts suitable for reforming are also conceivable. Moreover, it is possible to have a configuration with different types of catalyst materials (e.g. the ones mentioned above) in the first and second reforming reaction zone and/or different types of catalyst material in the addition zone and the third reforming reaction zone. Thus, as an example only, the first and third reforming reaction could contain one type of catalyst material, whilst the addition zone contains a different type of catalyst material.

In an embodiment, step e) of the method comprises leading the second feed stream into the second reforming reaction zone within a first part of the feed conduct arranged for conducting the second feed stream along the first reforming reaction zone, and inletting the second feed stream into the reformer tube via the second inlet in a second part of the feed conduct. Typically, the second feed stream within the feed conduct is heated by heat exchange between the feed conduct and the first reforming reaction zone upstream the second reforming reaction zone, prior to being inlet into the second reforming reaction zone. The feed conduct may alternatively or additionally be configured for heating the second feed stream by heat exchange between the second feed stream and the second reforming reaction zone.

In an embodiment, the second feed stream is conducted along the longitudinal axis of the reformer tube from a first and/or a second end of the reformer tube to the second reforming reaction zone. When the second feed stream is conducted in heat exchange contact with some of the second reforming reaction zone and optionally also the third reforming reaction zone prior to being inlet into the second reforming reaction zone, the temperature of the second feed stream is increased. The heat exchange may increase the temperature of the second feed stream to a higher temperature than the catalyst material within the first reforming reaction zone; this reduces the risk of carbon formation in the addition point of the second feed stream to the second reforming reaction zone and improves the overall operation of the chemical reactor. For example, the feed conduct may extend along most of or substantially all of the length of the reformer tube, and the second feed stream may thus be in heat exchange with the most of or substantially all of the length of the second reforming reaction zone.

In an embodiment, the second feed stream is conducted in heat exchange contact with at least a part of a longitudinal extent of the second reforming reaction zone. Thus, the feed conduct may be a tube extending within the reformer tube, along the longitudinal axis thereof, from one of the ends of the reformer tube. Alternatively, an inner feed conduct having inlets into the second reforming reaction zone may extend within the reformer tube from the first to the second end thereof.

In an embodiment, the step of inletting a second feed steam comprises inletting the second feed stream into the second reforming reaction zone at one or more points along a longitudinal axis of the reformer tube and/or into a frit material extending along at least a part the longitudinal axis for letting the second feed stream be released along at least a part of the longitudinal axis of the reformer tube housing the feed conduct. Thus, the second feed stream may be inlet, via one or more inlets, at a single distance along the longitudinal axis of the reformer tube, or via more than one inlet at different distances along the longitudinal axis. Additionally, or alternatively, the second part comprises a frit material allowing the second feed stream to pass through the frit material over a certain extent along the longitudinal axis. By use of a frit material instead of one or more inlets, the second feed stream may be added into the second reforming reaction zone over a larger area thereof.

In an embodiment, the second feed stream comprises: at least 90 dry mol % $CO_2$. The second feed stream may be substantially pure $CO_2$.

In an embodiment, the second feed stream further comprises one or more of the following: steam, hydrogen, carbon monoxide, oxygen, hydrogen sulfide, sulfur dioxide, nitrogen, argon, and combinations thereof. Additionally, the second feed stream could contain smaller amounts of methane. Such a second feed stream could for example be a recycle gas stream from a reducing gas process.

In an embodiment, the mole fraction between $CO_2$ in the second feed stream and hydrocarbons in the first feed stream is larger than 0.5. A ratio between $CO_2$ in the second feed stream and hydrocarbons in the first feed stream may e.g. be about 1:1; about 2:1, about 3:1, about 4:1, about 5:1, about 6:1 or even higher.

In an embodiment, the first feed stream further comprises hydrogen, carbon monoxide, carbon dioxide, oxygen, nitrogen, argon, higher hydrocarbons, or mixtures thereof.

In an embodiment, the steam-to-carbon ratio in the first feed stream is between about 0.7 and about 2.0. In the case where all hydrocarbons in the gas are in the form of $CH_4$, the steam to carbon ratio S/C would correspond to the ratio between $H_2O$ and $CH_4$. In the case where the gas also comprises higher hydrocarbons, the S/C ratio will be lower than the $H_2O/CH_4$ ratio.

In an embodiment, the heat source is arranged to heat the catalyst material within the reformer tube to temperatures of between about 650° C. and about 950° C. Typically, the pressure within the reformer tube is above 5 barg and below 35 barg, for example between 25 and 30 barg.

In an embodiment, the second feed stream in step f) is heated to a temperature of between about 700° C. and about 950° C. Hereby, the carbon formation area of the carbon limit diagram (or "Tøttrup diagram") (see FIG. 6) can be circumvented and a synthesis gas can be produced at more critical conditions than by reforming without addition of heated carbon dioxide.

According to a further aspect, the invention also relates to a plant for reforming of a first feed stream comprising a hydrocarbon gas and steam, the plant comprising a chemical reactor according to the invention. The chemical reactor is arranged to receive a first feed stream and a second feed stream and to output a first product gas. The chemical reactor comprises an addition point for addition of a third feed stream to the first product gas to a mixed gas, and an adiabatic reactor comprising a second catalyst material. The adiabatic reactor is arranged to receive the mixed gas and equilibrating reverse water gas shift reaction for the mixed gas to provide a second product gas having a lower $H_2/CO$ ratio than the first product gas. The reverse water gas shift reactor is e.g. an adiabatic reverse water gas shift reactor. By the plant of the invention, the $CO_2$ addition takes place both within the reformer tubes and downstream the reformer. Hereby, the temperature drop within the addition zone of the reformer tubes is reduced and thus the risk of carbon formation is reduced. The second catalyst material may be similar to the catalyst material described in relation to the other aspects of the invention. Alternatively, the second catalyst material may be a selective reverse water gas shift catalyst.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Figure 1:
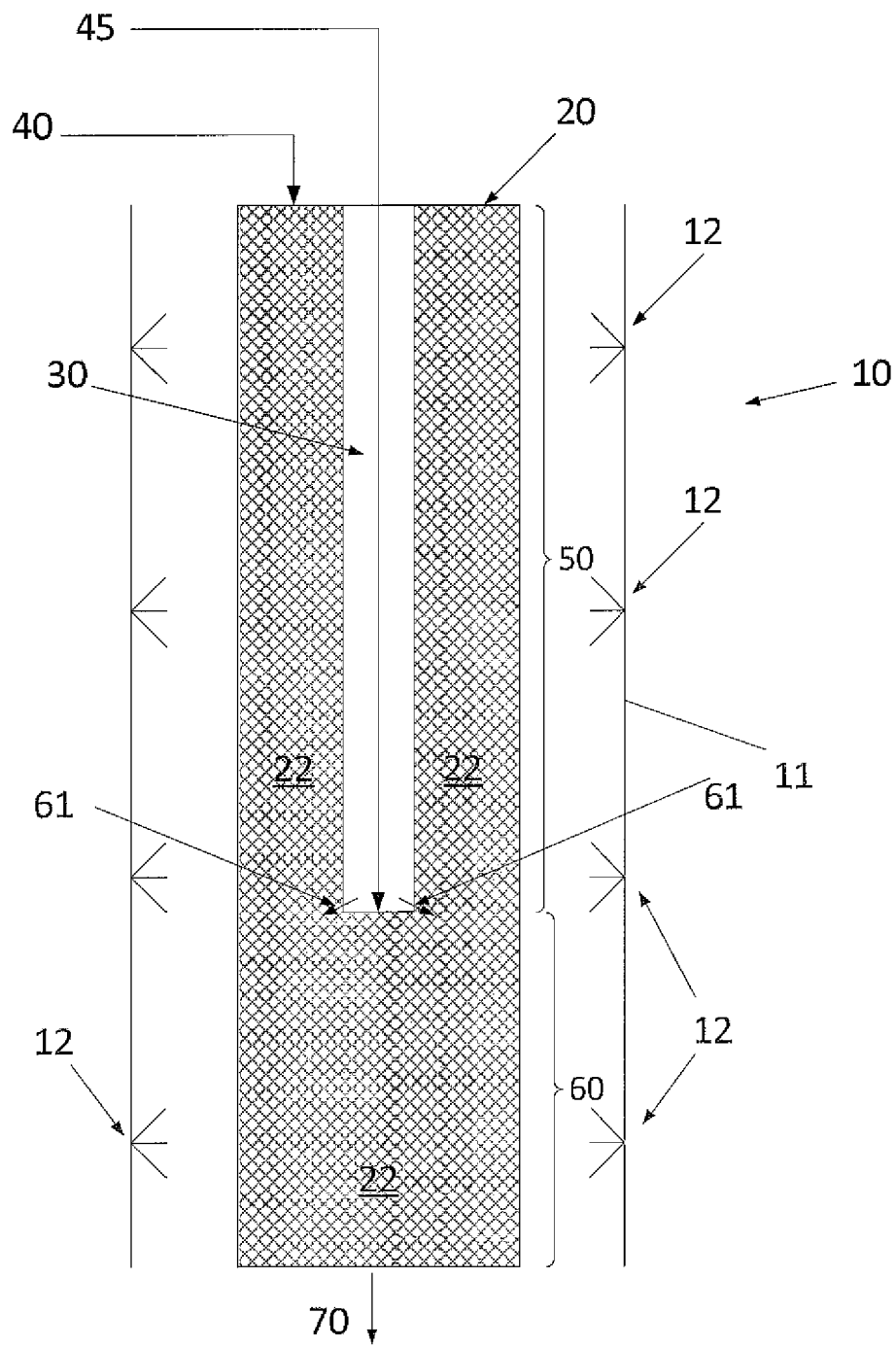
FIGS. 1 to 4b are schematic drawings illustrating cross sections through embodiments of a chemical reactor of the invention.

FIG. 1 is a schematic drawing illustrating a cross section through a chemical reactor 10 of the invention for carrying out reforming of a first feed stream comprising a hydrocarbon gas and steam. A typical reformer design is used so that the chemical reactor 10 of the invention, also denoted "the reformer", comprises a shell 11 housing one or more heat sources 12, such as burners, as well as a number of a reformer tubes 20 housing catalyst material 22 as shown by hatching. For the sake of simplicity, only a single reformer tube 20 is shown in FIG. 1; however, typically the reformer comprises a multitude of such reformer tubes 20. The reformer tube 20 is placed within the shell and is under operation heated by the heat sources 12. The configuration shown in FIG. 1 is a side fired reformer. The reformer tube 20 has a first inlet for feeding a first feed stream 40 into a first reforming reaction zone 50 of the reformer tube. The reformer tube 20 moreover comprises a feed conduct 30 arranged to allow a second feed stream 45 to be led in heat exchange contact with catalyst material 22 in the first reforming reaction zone 50 and to be added into a second reforming reaction zone 60 of the reformer tube 20 at addition points 61, where the second reforming reaction zone 60 is positioned downstream of the first reforming reaction zone 50. In the embodiment shown in FIG. 1, the second reforming reaction zone 60 consists of the addition zone or addition point 61 and the third reforming reaction zone downstream the addition point. Thus, in FIG. 1 the third reforming reaction zone constitutes most of the second reforming reaction zone 60, since the addition zone is constituted by one or more addition points at least substantially equal distance from the first inlet into the reformer tube 20. The second feed stream 45 is kept separate from the catalyst material 22 until the second reforming reaction zone 60, viz. until the addition points 61. During operation, CO rich reformed process gas 70 exits the reformer tube 20/the reformer 10.

Figure 2:
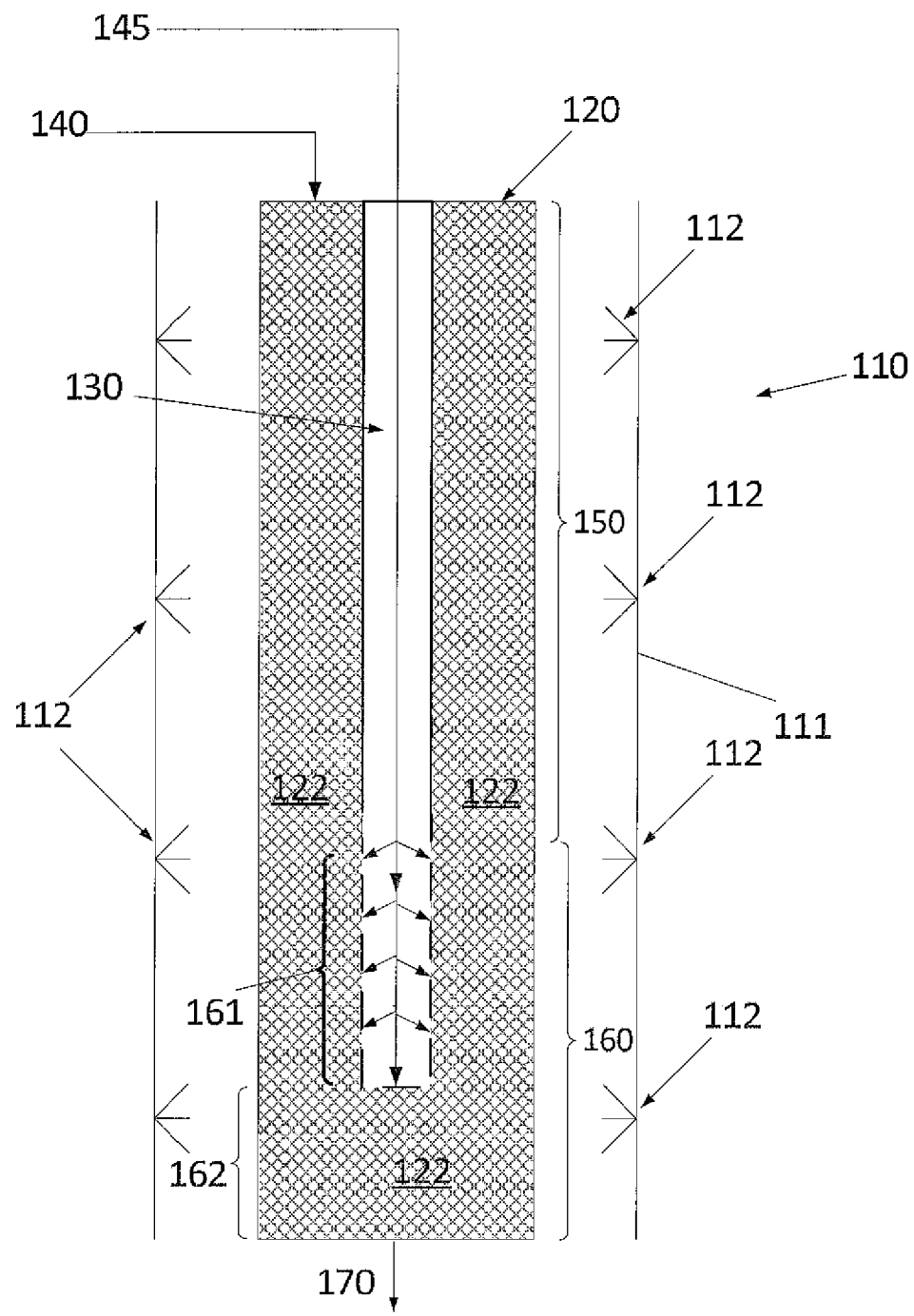

FIG. 2 is a schematic drawing illustrating a cross section through a chemical reactor 110 of the invention for carrying out reforming of a first feed stream comprising a hydrocarbon gas and steam.

The chemical reactor 110 of the invention, also denoted "the reformer", comprises a shell 111 housing one or more heat sources 112, such as burners, as well as a number of a reformer tubes 120 housing catalyst material 122 as shown by hatching. The reformer tube 120 is placed within the shell and is under operation heated by the heat sources 112. The configuration shown in FIG. 2 is a side fired reformer. The reformer tube 120 has a first inlet for feeding the first feed stream 140 into a first reforming reaction zone 150 of the reformer tube. The reformer tube 120 moreover comprises a feed conduct 130 having a first part extending longitudinally along the first reforming reaction zone 150 and arranged to conduct a second feed stream 145 along the first reforming reaction zone 150 and a second part arranged for inletting the second feed stream 145 into the catalyst material 122 within the second reforming reaction zone 160 of the reformer tube, where the second reforming reaction zone 160 is positioned downstream of the first reforming reaction zone 150 (as seen from both the first and second feed streams). In the embodiment shown in FIG. 2, the second part of the feed conduct 130 extends from the beginning of the second reforming reaction zone 160 to the lower end of the feed conduct 130. The second reforming reaction zone 160 contains an addition zone 161 corresponding to the second part of the feed conduct 130 and a third reforming reaction zone 162 downstream the addition zone 161.

The second part of the feed conduct 130 has a plurality of inlets into the second reforming reaction zone 160 as indicated by arrows from the second part of the feed conduct 130 into the catalyst material 122 of the reformer tube, viz. into the addition zone 161 of second reforming reaction zone 160. The inlets may be a plurality of individual inlets from the feed conduct 130 into the addition zone of the second reforming reaction zone 160, or the inlets may be formed by choosing a frit material for the lowermost part of the feed conduct (as seen in FIG. 2) which lets the second feed stream 145 be released into the addition zone 161 of the second reforming reaction zone 160 along at least a part of the longitudinal axis (not shown) of the reformer tube 120. As an alternative (not shown), the feed conduct 130 could be a through tube extending from the upper to the lower end of the reformer tube 120, where only a part thereof has inlets into the reformer tube 120. The resultant CO rich reformed process gas 170 exits the reformer tube 120/the reformer 110.

Figure 3:
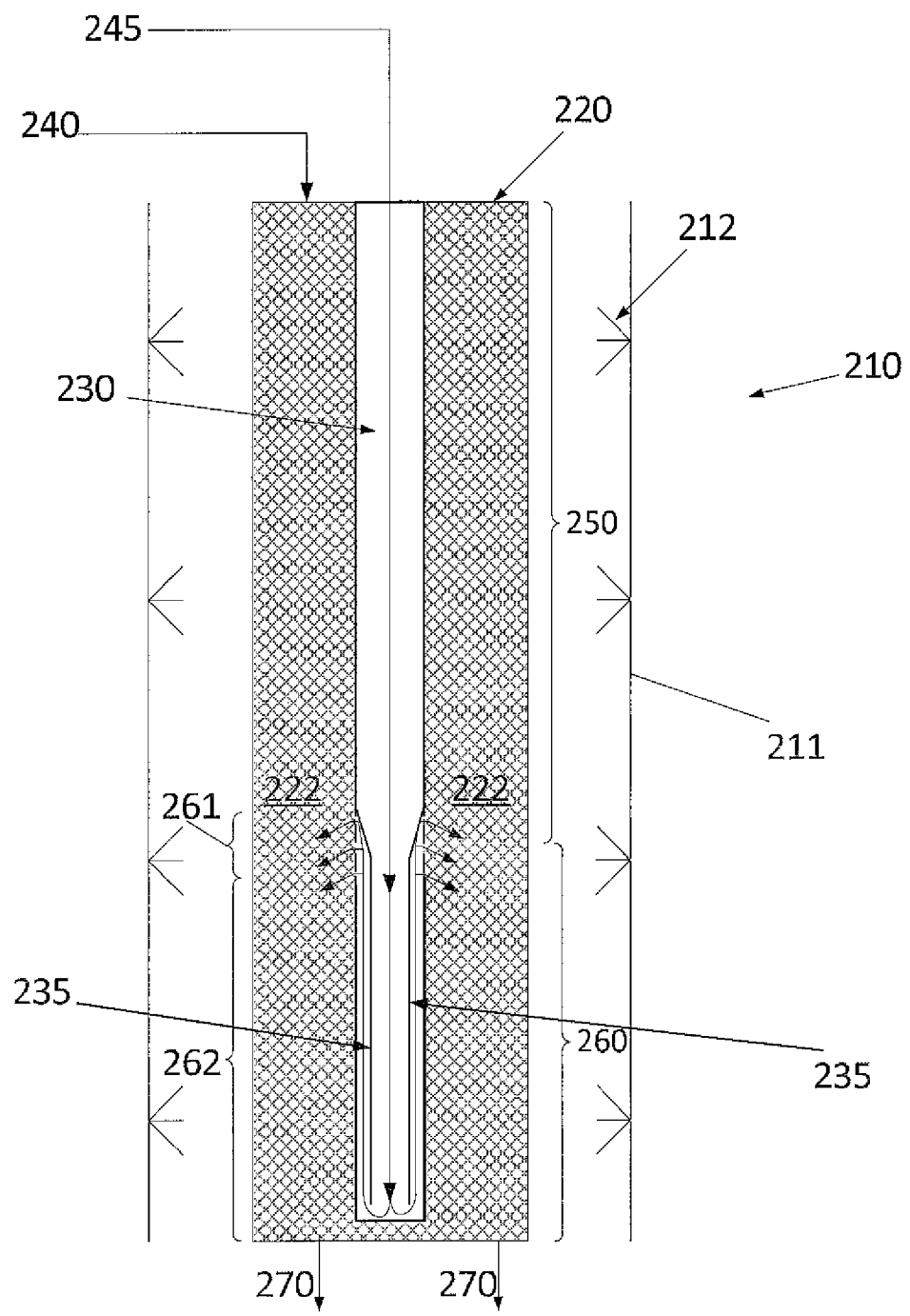

FIG. 3 is a schematic drawing illustrating an alternative chemical reactor 210 of the invention. The reactor 210 is a reformer tube reactor having a plurality of reformer tubes 220 within a shell 211; however, in FIG. 3 only one such reformer tube 220 is shown. Under operation, the reformer tube 220 is heated by one or more heat sources 212, such as burners. In the embodiment shown in FIG. 3, the reformer tube 220 is side fired. The reformer tube 220 has a first inlet for feeding a first feed stream 240 into a first reforming reaction zone 250 of the reformer tube 220. A second reforming reaction zone 260 extends from the lower part of the first reforming reaction zone 250 (as seen in FIG. 3) to the lower end of the reformer tube 220.

The reformer tube 220 moreover comprises a feed conduct 230 extending along a longitudinal axis (not shown in FIG. 3) of the reformer tube 220, in most of the length of the reformer tube 220. The part of the reformer tube 220 not taken up by the feed conduct 230 is shown as filled with catalyst material 222. Thus, the feed conduct 230 extends into the second reforming reaction zone 260. The feed conduct 230 comprises a baffle 235 arranged to conduct the second feed stream 245 in heat exchange contact with most of the second reforming reaction zone 260 prior to allowing the second feed stream 245 into an addition zone 261 of the second reforming reaction zone 245 via the second part of the feed conduct 230. This is illustrated by the arrows indicating the flow of the second feed stream 245 along the length of the feed conduct 230, where the second feed stream 245 at the bottom of the feed conduct 230 is redirected upwards along the inner wall of the feed conduct 230, between the feed conduct and the baffle 235.

The feed conduct 230 has a plurality of inlets into the addition zone 261 of the second reforming reaction zone 260 as indicated by arrows from the second part of the feed conduct 230 into the catalyst material 222 of the reformer tube. The inlets may be a plurality of individual inlets from the feed conduct 230 into the second reforming reaction zone 260, or the inlets may be formed by choosing a frit material for this second part of the feed conduct 230.

The second reforming reaction zone 260 of the reformer tube 220 thus contains an addition zone 261 and a third reforming reaction zone 262. Again, in the first reforming reaction zone 250, reforming of the first feed stream takes place as well as heat exchange between the first reforming reaction zone and the feed conduct. In the addition zone 261 of the second reforming reaction zone 260, the second feed stream 245 is added into the catalyst filled second reforming reaction zone 260. Here the second feed stream 245 is mixed with the partially reformed first feed stream 240. In the third reforming reaction zone, no further second feed stream is added. Here, reforming of the first and second feed streams takes place as well as heat exchange between the second feed stream 245 within the conduct and the catalyst material in the third reforming reaction zone of the reformer tube 220. Thus, the second feed stream 245 experiences heat exchange both in the first reforming reaction zone 250, in the addition zone 261 of the second reforming reaction zone 260 and in at least a part of, if not all of, the third reforming reaction zone 262. The resultant CO rich reformed process gas 270 exits the reformer tube 220/the reformer 210.

It should be noted, that even though FIG. 3 shows an embodiment where the feed conduct 230 does not extend in the whole length of the reformer tube 220, it is conceivable that the feed conduct 230 extends in the whole length of the reformer tube 220 or even protrudes through the lower end of the reformer tube 220 (as seen in FIG. 3) into the shell 211 heated by the heat sources 212. Such configurations would provide for further heating of the second feed gas 245.

Figure 4A:
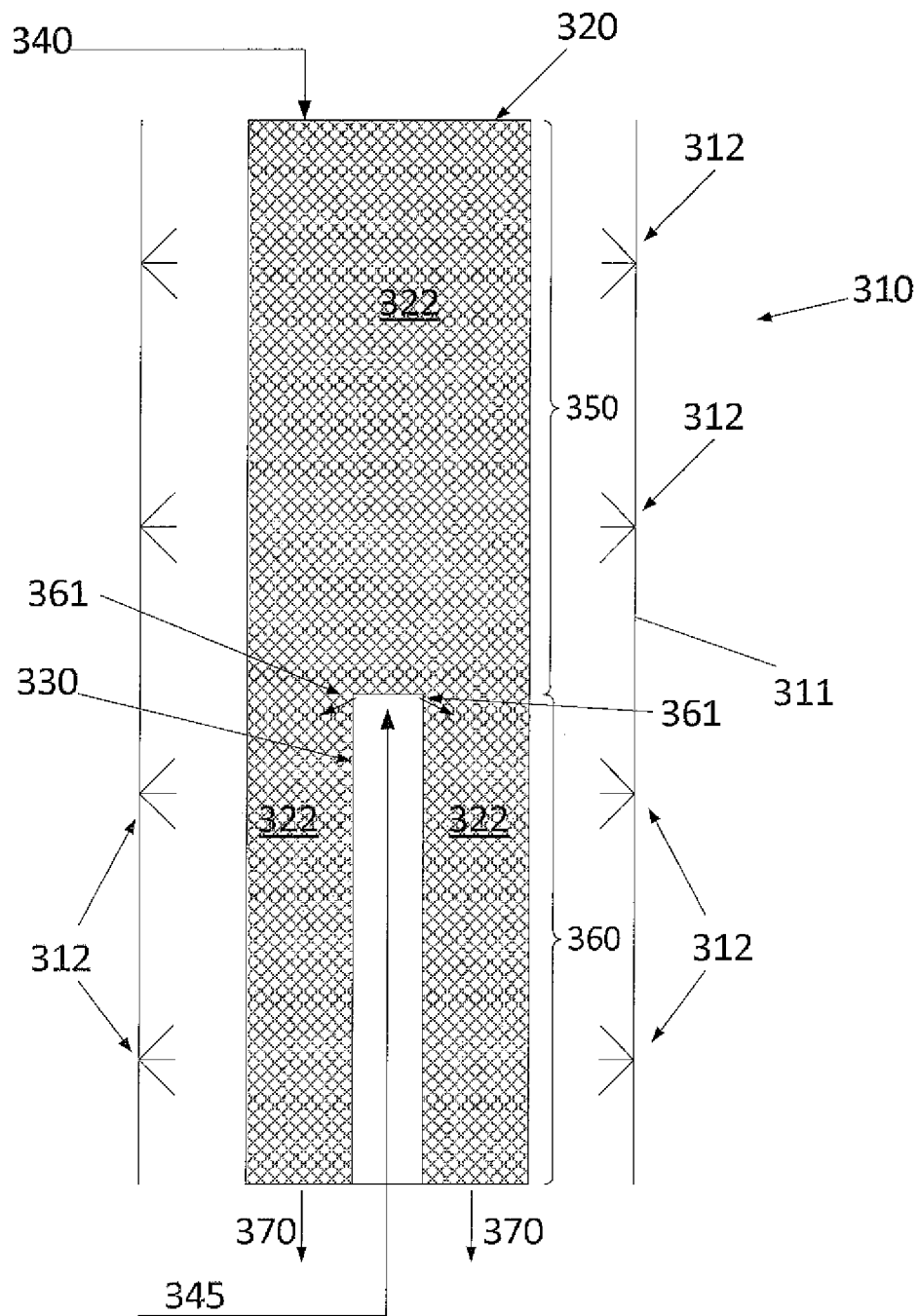

FIG. 4a is a schematic drawing illustrating a cross section through a chemical reactor 310 of the invention for carrying out reforming of a first feed stream comprising a hydrocarbon gas and steam. The chemical reactor 310 of the invention, also denoted "the reformer", comprises a shell 311 housing one or more heat sources 312, such as burners, as well as a number of a reformer tubes 320 housing catalyst material 322 as indicated by hatching. The reformer tube 320 is placed within the shell and is under operation heated by the heat sources 312. The configuration shown in FIG. 1 is a side fired reformer. The reformer tube 320 has a first inlet for feeding a first feed stream 340 into a first reforming reaction zone 350 of the reformer tube. The reformer tube 320 moreover comprises a feed conduct 330 arranged to allow a second feed stream 345 into a second reforming reaction zone 360 of the reformer tube 320, where the second reforming reaction zone 360 is positioned downstream of the first reforming reaction zone 350 (as seen from the flow direction of the first feed stream).

In the reformer 310 shown in FIG. 4a, the first feed stream 340 is inlet into the reformer tube 320 at a first, upper end thereof, whilst the feed conduct extends within the reformer tube from a second, lower end of the reformer tube 320. Also in this embodiment, the first reforming reaction zone extends from the upper end of the reformer tube 310, viz. from the inlet of the first feed stream, to the second reforming reaction zone 360. The second reforming reaction zone 360 extends from the most upstream (as seen in the flow direction of the first feed stream) inlet point(s) 361 of the second feed stream 345 until the lower end of the reformer tube 310. The second reforming reaction zone 360 consists of the addition zone or the addition points 361 and the third reforming reaction zone downstream the addition points 361. Thus, in FIG. 1 the third reforming reaction zone constitutes most of the second reforming reaction zone 360, since the addition zone is constituted by the one or more addition points 361 at at least substantially equal distance from the first inlet into the reformer tube 320. CO rich reformed process gas 370 exits the reformer tube 320/the reformer 310.

Figure 4B:
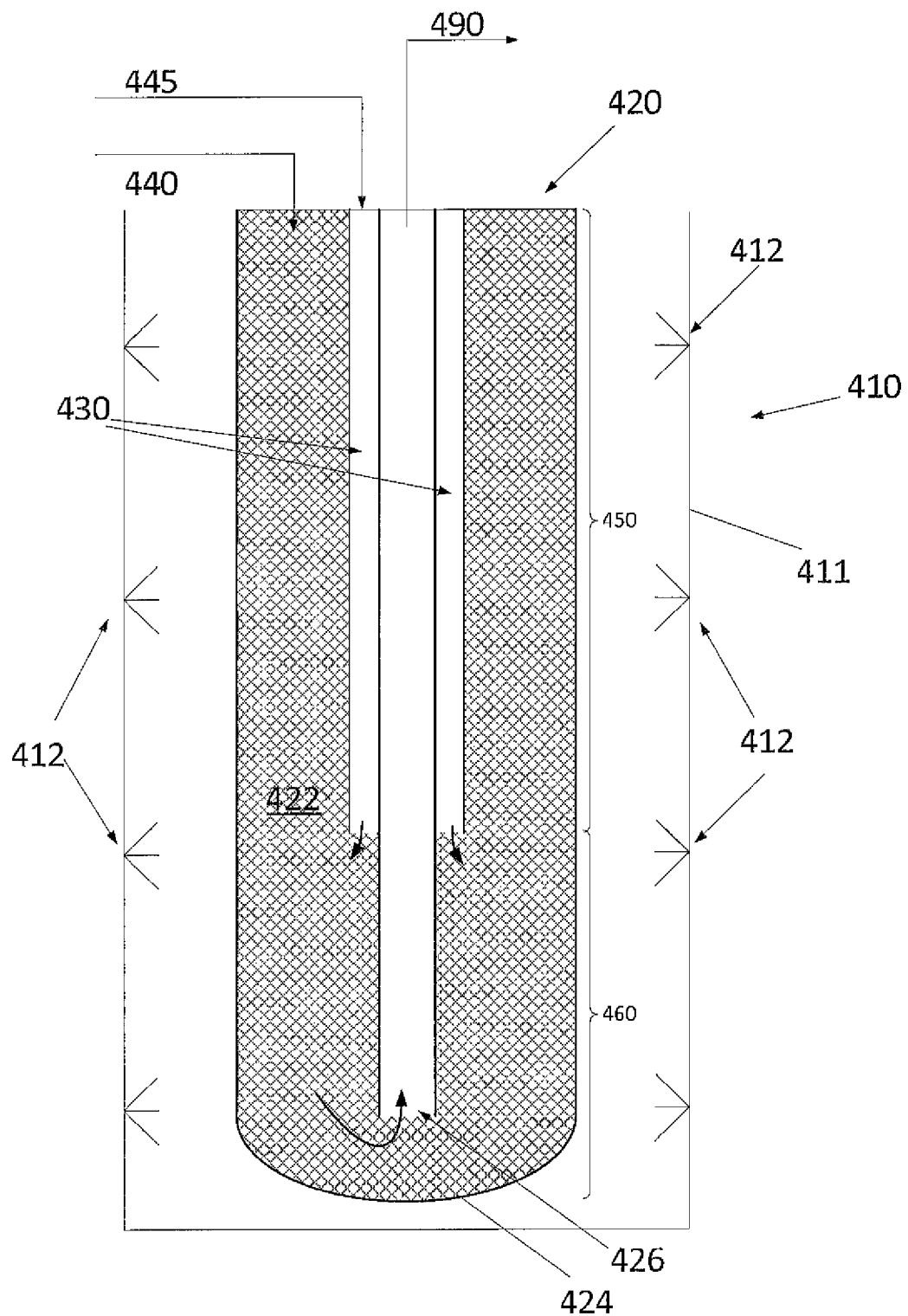

FIG. 4b is a schematic drawing illustrating an alternative reformer tube of the invention. FIG. 4b shows in a simplified form a cross section through a bayonet tube reactor 410 according to the invention. The bayonet tube reactor 410 has a plurality of reformer tubes 420 within a shell 411; however, in FIG. 4b only one such reformer tube 420 is shown. The reformer tubes 420 are under operation heated by heat sources 412. The reformer tube 420 comprises an outer tube 424, that is open at an inlet for inletting a first feed stream 440 in the upper end thereof (as seen in FIG. 4b), viz. into the first reforming reaction zone 450 of the reformer tube 420. The reformer tube 420 is closed in the lower end thereof (as seen in FIG. 4b). The first feed stream 440 typically comprises a hydrocarbon gas and steam. Within the outer tube 424 an inner tube 426 is located and fixed, coaxially spaced apart from the outer tube 424. The inner tube 426 is open at both its lower and upper end. The reformer tube 420 moreover comprises a feed conduct 430 coaxially spaced from both the outer and inner tubes and placed between the outer and inner tubes 424, 426. The feed conduct 430 extends coaxially along a part of the inner tube 426 along the longitudinal axis (not shown in FIG. 4b) of the reformer tube 420. The feed conduct 430 has inlet for allowing a second feed stream 445 into a second reforming reaction zone 460 of the reformer tube 420. Catalyst 422 is provided within the outer tube 424, but not within the feed conduct 430 or the inner tube 426. The catalyst 422 is shown by hatching in FIG. 4b.

In the reactor shown in FIG. 4b, the feed conduct 430 has inlets into the catalyst filled space of the outer tube 440, as shown by the arrows in the lower end of the feed conduct. However, the feed conduct could have a plurality of inlets along the longitudinal axis of the reformer tube 420 or the lower part of the feed conduct 430 could be made of a frit material allowing the second feed stream 445 to be released gradually into the second reforming reaction zone 460, that is along at least a part of the longitudinal axis of the reformer tube 410.

A first feed stream 440 comprising a hydrocarbon gas and steam is fed into the reformer tube 420, viz. the first reforming reaction zone 450, via one or more inlets in the upper end of the reformer tube 420. The process gas is subsequently passed through catalyst 422 arranged between the walls of the outer tube 424 and the feed conduct 430. Having passed through the first reforming reaction zone 450, the process gas is mixed, in an addition zone of the second reforming reaction zone 460, with the second feed stream 445. The mixed gasses are passed through catalyst 422 between the walls of the outer tube 424 and the inner tube 426 in the third reforming reaction zone (not shown in FIG. 4b) within the second reforming reaction zone 460. Subsequently, the gas continues downwards (as seen in FIG. 4b) until it impinges on the lower end of the outer tube 424, where it reverses its direction and continues into the inner tube 426, through which the gas stream is withdrawn as a product stream 490. Heat exchange takes place between the process gas within the first reforming reaction zone 450 and the second feed stream 445 within the feed conduct 430, between the process gas in the second reforming reaction 460 and the product gas 490 in the inner tube 426 as well as between the second feed stream 445 within the feed conduct and the product gas 490 in the inner tube 426.

It should be understood that FIGS. 1 to 4b are schematic drawings only illustrating the relevant part of the chemical reactor 10, 110, 210, and 310 of the invention. Thus, the shell 11, 111, 211, and 311 is in reality a substantially closed housing with upper and lower walls which are not shown in FIGS. 1 to 4b. Moreover, FIGS. 1 to 4b do not show inlets for providing the first feed stream and the second feed stream into the reformer tube 20, 120, 220, and 320 or an outlet for outletting a reformed gas stream from the reformer tube 20, 120, 220, and 320 and from the chemical reactor 10, 110, 210, and 310. In the FIGS. 1 to 4b, the chemical reactors 10, 110, 210 and 310 are shown as having only a single reformer tube for simplicity. However, typically the shell of a chemical reactor houses a plurality of reformer tubes. Moreover, it should be noted that even though the embodiments shown in FIGS. 1 to 4b are all side fired reformers, other types of fired reformers are conceivable within the concept of the invention, such as top fired, terrace fired or bottom fired reformers.

In FIGS. 1 to 4b, the part of the reformer tubes not taken up by the feed conduct is shown as filled with catalyst material. It should be noted that catalyst might not fill up all the available space within the reformer tube in that inert material may be present, e.g. on top of the catalyst material, in between the reforming reaction zones, and/or the topmost part of the reformer tube may be left empty.

It should also be noted that in the embodiments shown in FIGS. 1 and 4 it is indicated that the second feed stream is inlet into the second reforming reaction zone at a single point along the longitudinal direction of the reformer tube 10, 310. In this case, the third reforming reaction zone can be seen as substantially corresponding to the second reforming reaction zone, since the addition zone of the second reforming reaction zone has no substantial extent in the longitudinal direction of the reformer tube 10, 310.

Figure 5:
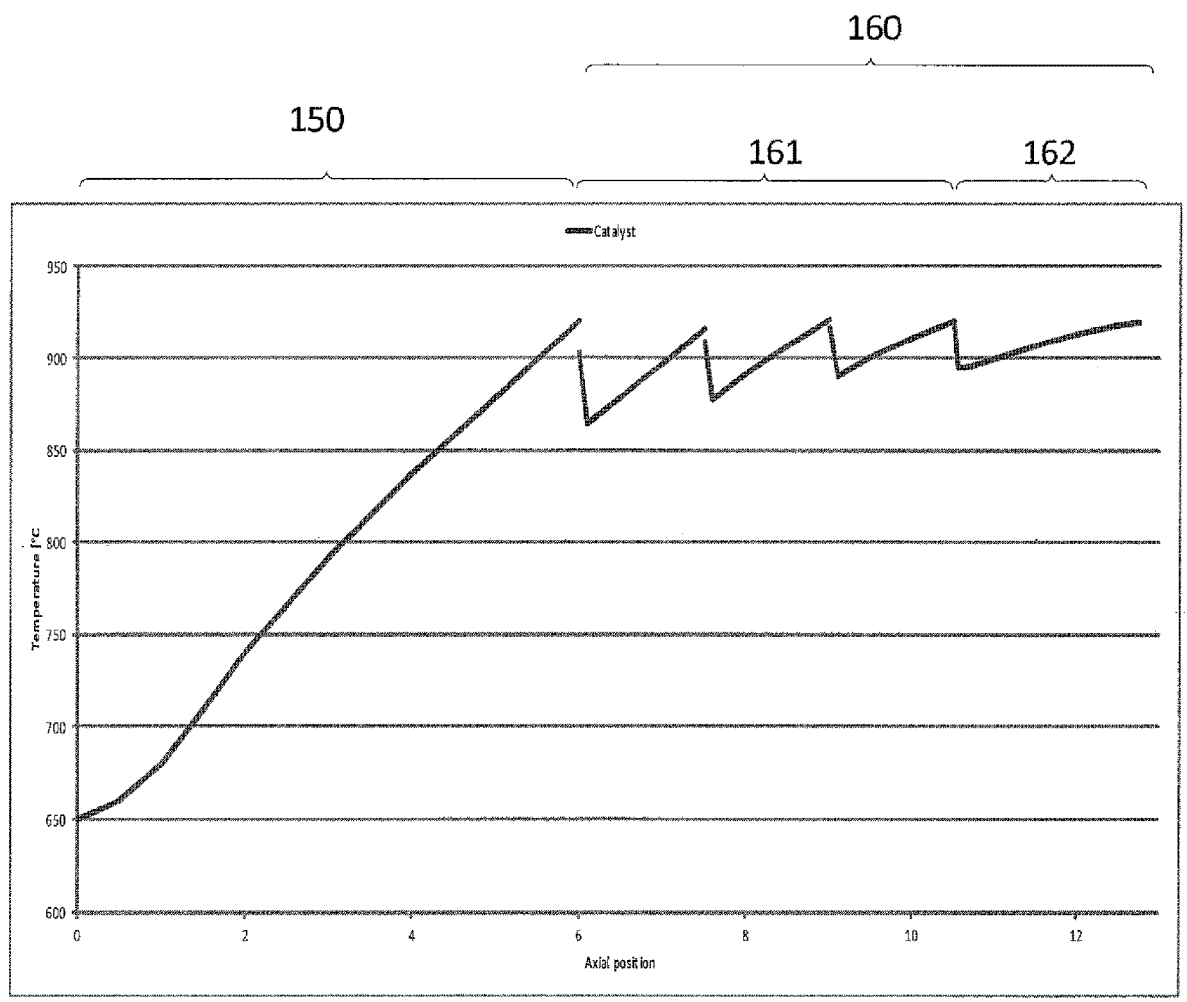
FIG. 5 is a diagram showing the temperature within a reformer tube of the invention as a function of axial position.

FIG. 5 is a diagram showing the temperature within a reformer tube of the invention as a function of axial position. The reformer tube used has a length of 13 meter, and it could e.g. be a reformer tube 110 as shown in FIG. 2. An axial position of 0 meter corresponds to the inlet into the reformer tube and an axial position of 13 meter corresponds to the outlet of the reformer tube. The reformer tube is side fired as shown in FIG. 2. Within the first meter of the reformer tube, the temperature rises from about 650° C. to about 785° C. A feed stream reaches catalyst material within the reformer tube after the inlet, viz. at an axial position of about 0 meter. Typically, the feed stream has a temperature of 450-650° C., when it enters the reformer tube, such as e.g. about 650° C. The first reforming reaction zone 150, where the inlet feed stream reacts with reforming catalyst material within the reformer tube corresponds to axial positions between about 0 meter and about 6 meters.

The second feed stream, typically a $CO_2$ rich feed stream, e.g. pure $CO_2$, is inlet into the catalyst material of the reformer tube at four different axial positions, i.e.

four different points along the longitudinal axis of the reformer tube. In FIG. 5, the four different, axial positions are at about 6 meters, about 7.5 meters, about 9 meters and about 10.5 meters. The second reforming reaction zone 160 thus ranges from about 6 meters to the outlet of the reformer tube at an axial position of about 13 meter. Within the second reforming reaction zone 160, the addition zone 161 ranges from the first to the last inlet, viz. from about 6 meters to about 10.5 m, and the third reforming reaction zone 162 ranges from the end of the second reforming reaction zone to the end of the reactor tube, viz. from about 10.5 m to about 13 meter. A final conversion and heating of the process gas takes place in the third reforming reaction zone 162.

Because of the endothermic nature of the reverse water gas shift reaction and its fast reaction rate, a very rapid temperature drop follows addition points of $CO_2$ rich feed stream into the second reforming reaction zone. To avoid carbon formation at the points of adding the second feed stream into the second reforming reaction zone housing catalyst material, the temperature of the process gas within the second reforming reaction zone should be sufficiently high in order to avoid a temperature reduction that could lead to carbon formation on the catalyst material. However, when the reformer tube has multiple inlets from the feed conduct into the second reforming reaction zone, the catalyst material and process gas within the reformer tube does not need to be as high as in the case of only inlet(s) at a single longitudinal position along the reformer tube. In the case of four additions points illustrated in FIG. 5, the temperature drops in the addition points are relatively low. Calculations show that the mean approach to equilibrium for the carbon formations reactions is never within 10° C. In this case the operating point of the reformer reactor moves four times in the carbon-limit diagram of FIG. 6 along the line $H_2O/CH_4=1.0$ from the point indicated "Reformer inlet" to the point indicated "After CO2 addition".

The second feed stream is preheated prior to being inlet into the second reforming reaction zone, typically to a temperature of about 850° C.

Figure 6:
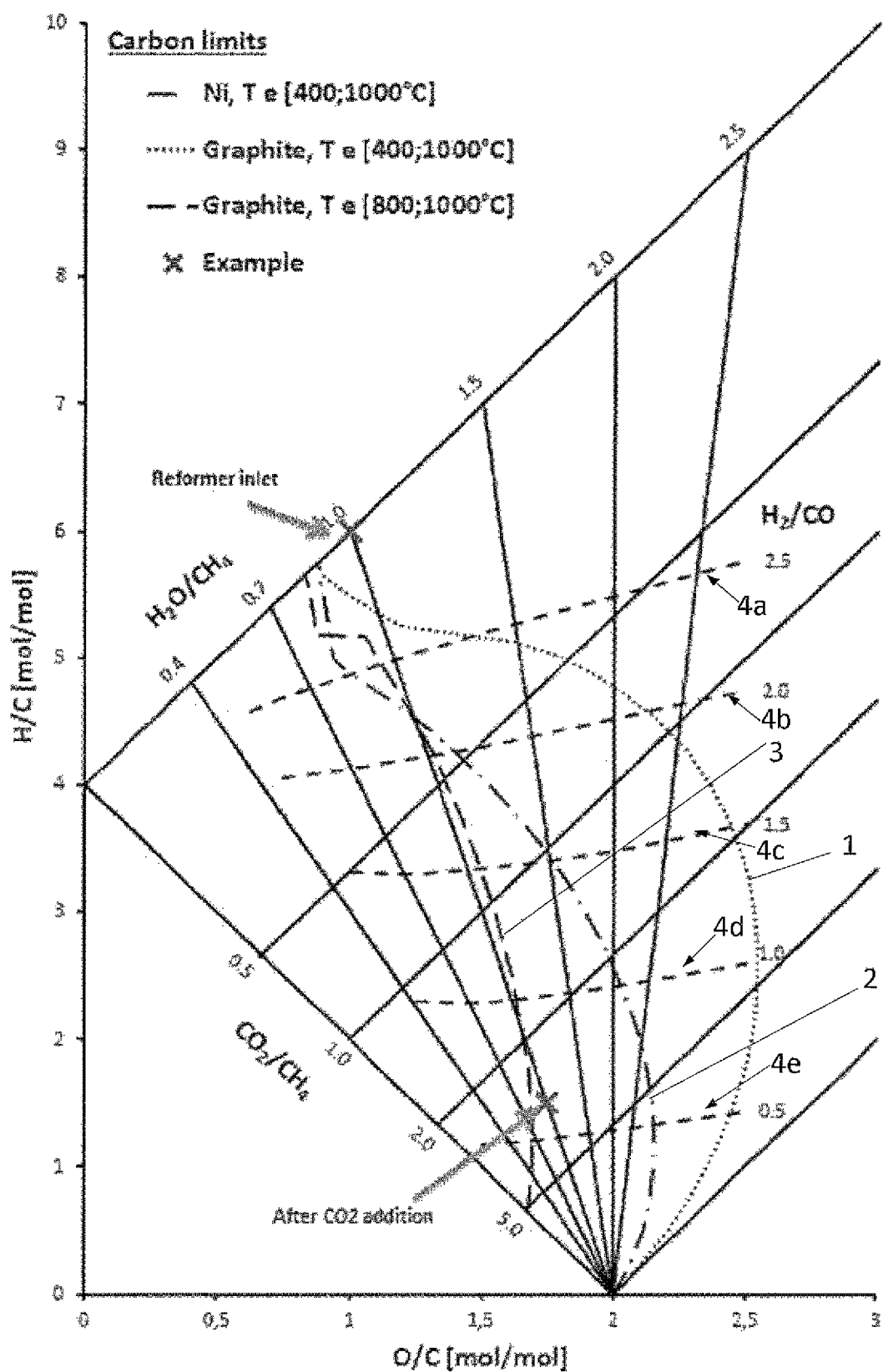
FIG. 6 is a carbon limit diagram illustrating carbon limits in different scenarios.

FIG. 6 is a carbon limit diagram illustrating carbon limits in different scenarios. A carbon limit diagram is also denoted "Tøttrup diagram". In general, it is essential to design a reforming plant to avoid carbon formation on the catalyst material in the reformer tubes of the reformer reactor. In this diagram a given gas composition will have a fixed H/C and O/C ratio, which is shown on the x- and y-axis, independently of how far the reforming reactions have proceeded. As example, a feed gas containing 44% $CH_4$, 46% $H_2O$, 5% $H_2$, 4% $CO_2$, and 1% CO has an H/C and O/C ratio of 5.67 and 1.12, respectively. Reforming this gas to an equilibrium at 950° C. and 25 bar would give a gas composition 8% $CH_4$, 9% $H_2O$, 61% $H_2$, 2% $CO_2$, and 20% CO; however, the H/C and O/C ratios of 5.67 and 1.12, respectively, have not changed. Additionally, the diagram contains axis which shows the composition of a gas with a given H/C and O/C ratio normalized to a feed of only $H_2O$, $CH_4$, and $CO_2$, as "$H_2O/CH_4$" and "$CO_2/CH_4$" axis. As example, the gas above with a H/C and O/C ratio of 5.67 and 1.12, respectively, would correspond to a normalized gas with "$H_2O/CH_4$" and "$CO_2/CH_4$" of 1.05 and 0.08, respectively.

Carbon formation in the tubes of a reforming reactor, also denoted "reformer", is dictated by thermodynamics and in a typical design of a reformer it is a requirement that the reformer does not have affinity for carbon formation of the equilibrated gas anywhere in the catalyst material. This means that the process gas or feed stream will have to be balanced with water in order to circumvent the carbon formation area. Typically, the process gas enters the reformer at 400-500° C., while leaving the reformer at about 950° C. (not experiencing temperatures above 1000° C.). Thus, when designing a reformer, there must not be an affinity for carbon formation of the equilibrated gas anywhere in the temperature range from 400° C. to 1000° C. This criterion can be used to evaluate the carbon limit of the reformer, as illustrated by the line labeled "Ni, Te [400; 1000° C.]" in the carbon limit diagram in FIG. 6.

If potential for carbon formation exists, it will only be a matter of time before a shutdown of the reactor is necessary due to too high pressure drop. In an industrial context, this will be expensive due to lost time on stream and loading of a new batch of catalyst material into the reformer tubes. Carbon formation at reforming conditions is as whisker carbon. This is destructive in nature toward the catalyst material and regeneration of the catalyst material is therefore not an option. Thus, the possible operating range for a tubular reformer will be defined by the conditions which will not have a potential for carbon formation. When sufficient knowledge about the thermodynamics of carbon formation for a specific catalyst material is known, the exact limit for carbon formation can be calculated and this can be illustrated by the carbon limit curves depicted in the carbon limit diagram of FIG. 6. The carbon limit for graphite is shown as the dotted curve 1, whilst the carbon limit for an industrial nickel catalyst is shown as the curve 2. As the carbon limits have to be defined in a worst case scenario, the curve for industrial nickel catalyst represents a nickel catalyst aged for several years in a reforming plant where the catalyst has been severely sintered. The curves are derived from the principle of equilibrated gas and show the most severe conditions (as a function of initial normalized $H_2O/CH_4$ and $CO_2/CH_4$ ratios, or O/C and H/C ratios) which can be tolerated in the entire temperature range from 400° C. to 1000° C. at a pressure of 25.5 bar. Carbon formation will be expected to the left of the curves and operation without risk of carbon formation will be expected to the right of the curves. This shows that the tendency for carbon formation increases with decreasing $CO_2/CH_4$ and $H_2O/CH_4$ ratios in the feed gas. The severity of operation can be defined relative to the placement compared to the carbon limit curves; operation to the left of and far beyond the carbon limit curve is considered very severe.

The dotted lines (4a-4e) in FIG. 6 show the equilibrated $H_2/CO$ ratio of a synthesis gas produced at 950° C. and 25.5 bar as a function of the O/C and H/C ratio or normalized $CO_2/CH_4$ and $H_2O/CH_4$ ratios. Increasing the $CO_2/CH_4$ ratio of the feed stream will decrease the $H_2/CO$ ratio accordingly. The lines show that the $H_2/CO$ ratio increases with increasing H/C ratio, as it is around 2.5 when H/C is around 5, while being around 0.5 when H/C is around 1. These lines additionally translate into the normalized "$H_2O/CH_4$" and "$CO_2/CH_4$" ratio, which shows that the $H_2/CO$ ratio of the product gas can be controlled by adjusting the addition of $H_2O$ and $CO_2$, where more $H_2O$ will increase the product towards hydrogen rich gas and more $CO_2$ will increase the product towards CO rich gas. However, when producing a synthesis gas with a very low $H_2/CO$ ratio, an accompanied high $H_2O/CH_4$ will be necessary to balance the severity of the gas to avoid carbon formation on a nickel catalyst. From FIG. 6 it can be seen that producing a synthesis gas with a $H_2/CO$ ratio below 1 requires a large excess of water to avoid carbon formation. As example, to produce a synthesis gas of $H_2/CO=0.7$ in a standard reformer with a nickel catalyst will require a feed composition of $H_2O/CH_4=3$ and $CO_2/CH_4=4.5$.

A principle of the current invention is illustrated by the third carbon limit curve 3 in FIG. 6. Where the normal reforming case confines the temperature of the reactor to be between 400° C. and 1000° C., the concept of this invention utilizes that this limit can be moved if the temperature interval is changed. Thus, if the lower temperature limit is increased to 800° C., the limit for carbon formation will change accordingly, as shown by the difference in the two carbon limit curves for graphitic carbon, 1 and 3, respectively.

In a SPARG (Sulfur Passivated ReforminG) process, sulfur is used to selectively poison the most active sites and in this way prevent formation of carbon while maintaining some activity for reforming. Thus, the SPARG process offers a route to circumvent the carbon limit curves of FIG. 6. However, comparing the $CO_2$ shifted reforming of the present invention to SPARG, the $CO_2$ shifted reforming has at least the advantage that sulfur does not need to be added, which makes the size of the system significantly smaller.

Alternatively, noble metal catalysts may be used to circumvent the carbon limits of FIG. 6 somewhat, since noble metals generally have a lower tendency for carbon formation compared to nickel catalysts. Noble metal catalyst thus offers a route for operation at severe conditions without carbon formation. However, noble metal catalysts are more expensive than nickel catalysts and to the best of our knowledge, very severe operation over noble metal catalysts has never been assessed in industrial scale.

As an example of the current invention, consider a case where a synthesis gas with $H_2/CO$ ratio of 0.7 is wanted. A mixture of steam and methane 40, 140, 240, 340 is fed to the first reforming reaction zone 50, 150, 250, 350 of a reformer former tube 10, 110, 210, 310, and the ratio between steam ($H_2O$) and methane ($CH_4$) is chosen with respect to the typical carbon limit for Ni catalysts (the curve in FIG. 6 with alternating dots and lines, viz. curve 2) and the desired synthesis gas. The reformer tube 10, 110, 210, 310 contains a typical reforming catalyst 22, 122, 222, 322 in the first and second reforming reaction zones as shown by the hatching in FIGS. 1 to 4b. Such reforming catalyst may be nickel based catalyst; however, practically any catalyst suitable for reforming could be used.

To produce the desired gas, it is chosen to operate at a $H_2O/CH_4$ ratio of 1, illustrated by the cross indicated by "Reformer inlet" in FIG. 6. A $CO_2$ rich feed (in the current example pure $CO_2$) is fed to a feed conduct 30, 130, 230, 330 which does not house catalyst material.

Towards the bottom of the first reforming reaction zone 50, 150, 250, 350 the temperature of the gas in the first reforming reaction zone 50, 150, 250, 350 as well as the temperature of the $CO_2$ rich gas within the feed conduct 30, 130, 230, 330 are both about 850° C. or higher. This temperature is determined on the basis of the actual gas compositions. This point along the longitudinal axis of the reformer tube 10, 110, 210, 310, corresponding to the transition between the first and second reforming reaction zones, is where the partly reformed gas within the first reforming reaction zone is mixed with heated $CO_2$ rich gas. The addition of the heated $CO_2$ rich gas into the second reforming reaction zone shifts the operating point within the carbon limit diagram in FIG. 6 from the cross denoted "Reformer inlet" to the cross denoted "After CO2 addition", corresponding to an unchanged $H_2O/CH_4$ ratio of 1, but a change in the $CO_2/CH_4$ ratio to about 2.6 (instead of a $CO_2/CH_4$ ratio of 0 before the addition of $CO_2$ rich gas).

Downstream of the addition point of the $CO_2$ rich gas, viz. in the second reforming reaction zone, the gas is reformed further to achieve sufficient conversion of methane and finally leaves the reformer tube 10, 110, 210, 310 at a temperature of about 950° C. and a $H_2/CO$ ratio of 0.7. In this case the overall process gas has normalized ratios $H_2O/CH_4=1$ and $CO_2/CH_4=2.6$. Because the gas is kept above 800° C. from the addition point of $CO_2$, it is no longer carbon limit curve 2, which dictates the limit for carbon formation, but instead carbon limit curve 3. As seen from FIG. 3, the new operating point (denoted "after CO2 addition" in FIG. 3) is placed on the right side of carbon limit curve 3 and carbon formation is therefore not expected. In order to achieve an outlet gas having a $H_2/CO$ ratio of 0.7 with a conventional reformer tube having a nickel based catalyst, the overall process gas would have ratios $H_2O/CH_4=3$ and $CO_2/CH_4=4.5$. Consequently, the co-feed of $CO_2$ and $H_2O$ of the current invention is significantly lower compared to the feed in the nickel based reformer case.

Figure 7:
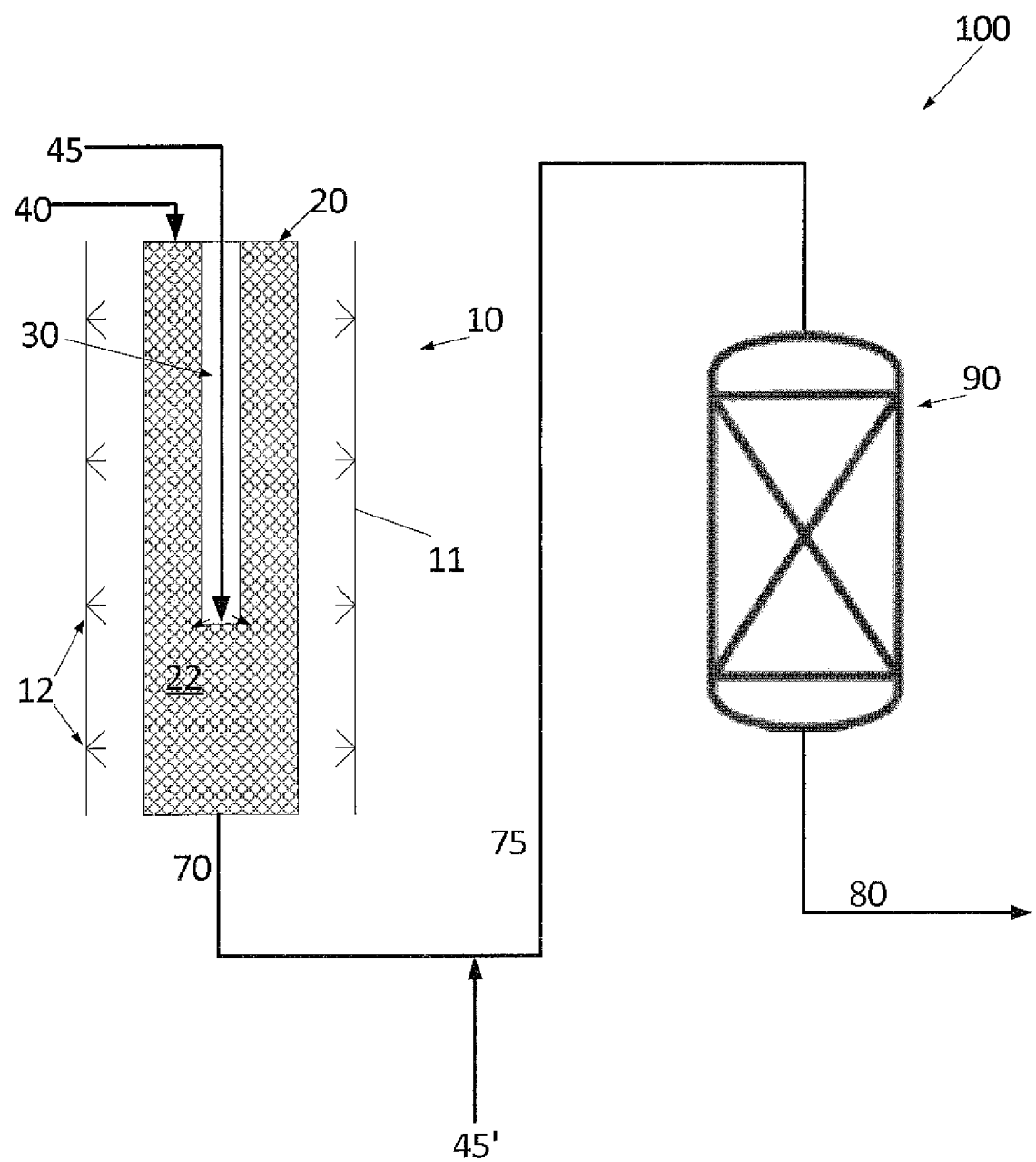
FIG. 7 is a drawing of a chemical plant with a steam reformer and further $CO_2$ addition.

FIG. 7 is a drawing of a chemical plant 100 with a steam reformer 10 according to the invention and further $CO_2$ addition. To circumvent the drop in temperature in the addition zone of the second reforming reaction zone of the reformer reactor tubes, the $CO_2$ addition taking place within the reformer tubes is supplemented with a subsequent addition of hot $CO_2$ rich gas stream 45' downstream the reforming reactor 10. As seen in FIG. 7, the resulting gas stream 75 is subsequently equilibrated over an adiabatic reactor 90 arranged to facilitate the reverse water gas shift (RWGS) reaction and potentially also the reforming/methanation reaction, resulting in a CO rich product gas stream 80. The adiabatic reactor 90 comprises a second catalyst material, e.g. catalyst material arranged for both the reverse water gas shift and the steam methane reaction. However, the second catalyst material could also be a selective reverse water gas shift catalyst. From Table 2 below, it can be seen that the $H_2/CO$ ratio of the product gas stream 80 from the plant 100 is 30.5/42.1=0.72, which substantially corresponds to the $H_2/CO$ ratio of the product stream in Table 1; however, in the plant 100 of FIG. 7, the $CO_2$ added has been split up, thereby minimizing the risk of carbon formation. It should be noted that the $CO_2$ rich gas stream 45' added downstream the reformer 10 could contain further components than $CO_2$. Moreover, the concept of splitting the $CO_2$ addition up could also entail yet further addition(s) of $CO_2$ rich gas stream(s) downstream the RWGS reactor 90 followed by equilibrating in additional RWGS reactor(s). It should also be noted that even though FIG. 7 shows the plant 100 with the reactor 10 of FIG. 1, any of the reactors of the invention could be used in the plant 100.

EXAMPLES

An example of the process is illustrated in Table 1 below. A first feed stream comprising a hydrocarbon gas and steam and having a S/C ratio of 1 is fed to the first reforming reaction zone of a reformer or reformer tube 10 of the invention as shown in FIG. 1. This first feed stream is heated and reformed to a temperature of 850° C., within the first reforming reaction zone. Subsequently, it is mixed with $CO_2$ which has been heated to 850° C., by heat exchange between the first reforming reaction zone and the feed conduct, while traveling within the feed conduct. Prior to the mixing of the $CO_2$ and the process gas within the first reforming reaction zone, the $H_2/CO$ ratio is 3.95. Subsequently to the mixing of the process gas within the first reforming reaction zone and the $CO_2$ from the feed conduct, viz. in the second reforming reaction zone, the mixed process gas is further heated to 950° C. by means of the heaters, while reforming continues to take place. The resulting product gas is a synthesis gas of having a ratio $H_2/CO=0.7$ at 950° C.

TABLE 1

Example of process (FIG. 1)

| | |
|---|---|
| Feed (40) $CH_4$ [$Nm^3/h$] | 1000 |
| Feed (40) $H_2O$ [$Nm^3/h$] | 1000 |
| Feed (45) $CO_2$ [$Nm^3/h$] | 2600 |
| P [bar] | 25.5 |
| $T_{addition}$ | 850 |
| $H_2/CO$ prior to $CO_2$ addition | 3.95 |
| Temp. of $CO_2$ feed [° C.] (45) prior to addition | 850 |
| $T_{exit}$ [° C.] | 950 |
| $H_2/CO$ exit | 0.70 |
| Methane slip exit [dry %] | 0.54 |

Thus, when the chemical reactor, the reformer tube or the process according to the inventions is used, the problems of carbon formation during reforming of a $CO_2$ rich gas are alleviated. This is due to the fact that the carbon limits are circumvented as shown in the carbon limit diagram of FIG. 6 by adding $CO_2$ to the hot part of the catalyst material in a reformer tube.

In the Example described above, the second feed stream is a heated stream of pure $CO_2$. Alternatively, the second feed stream could be a $CO_2$, $H_2O$, $H_2$, CO, $O_2$, $H_2S$ and/or $SO_2$. Such a second feed stream could for example be a recycle gas stream from a reducing gas process, as described below.

TABLE 2

Example of process (FIG. 7)

| | Reformer | RWGS |
|---|---|---|
| Inlet T [° C.] | 650 | 912 |
| Outlet T [° C.] | 950 | 906 |
| Outlet MDC T [° C.] | 1159 | 1062 |
| NG feed addition [$Nm^3/h$] | 1000 | — |
| $H_2O$ feed addition [$Nm^3/h$] | 1000 | — |
| $CO_2$ feed addition [$Nm^3/h$] | 2000* | 600** |
| $H_2$ out [dry mol %] | 36.9 | 30.5 |
| CO out [dry mol %] | 43.2 | 42.1 |

*The $CO_2$ is added by a feed conduct as a second feed as e.g. in FIG. 1.
**Second $CO_2$ rich gas stream is heated to 650° C. before mixing with the gas 70.

Reducing Gas Process

As mentioned, the reactor, the reformer tube, and the process of the invention are also suitable for reforming where the second feed stream is a recycle stream from a reducing gas process. Such a recycle stream could arise from a higher alcohol synthesis and would then typically comprise primarily $CO_2$ and a smaller fraction of $H_2S$. Alternatively, the recycle stream could arise from the iron reducing processes, such as the one known under the trademark "Midrix". As mentioned above, carbon formation in a reformer is dictated by thermodynamics and the catalyst material in the reformer should not have affinity for carbon formation anywhere in the catalyst material.

In a traditional reformer, the input hydrocarbon feed stream would have to be balanced with water in order to circumvent the carbon formation area as described in connection with FIG. 6. Typically, the hydrocarbon feed stream enters a reducing gas reformer at a temperature of between about 500 and about 600° C., while leaving the reducing gas reformer at a temperature of about 950° C., at least not experiencing temperatures above 1000° C. Thus, when designing a reducing gas reformer, there must not be an affinity for carbon formation anywhere between 500-1000° C. The carbon formation is somewhat hindered by the presence of sulfur in the recirculated reducing gas containing sulfur from the metals to be reduced, but the process is limited by carbon formation at low H/C levels and from content of higher hydrocarbons in the feed. Higher hydrocarbons are meant to denote hydrocarbons with more than one carbon atom, such as ethane, ethylene, propane, propylene, etc.

In the reformer reactor, the reformer tube and the process according to the invention as used in connection with a reducing gas plant, the first feed stream comprising a hydrocarbon gas and steam is inlet as into a first reforming reaction zone of the reformer tube. This first reforming reaction zone houses reforming catalyst material, typically nickel based catalyst. The recycle feed stream from the reducing gas plant is fed as a second feed stream into a second reforming reaction zone of the reformer tube, positioned downstream of the first reforming reaction zone. The recycle feed stream from the reducing gas plant may be led within a feed conduct within the first reforming reaction zone so that the recycle feed stream is heated by heat exchange with the catalyst material and process gas within the first reforming reaction zone prior to mixing the thus heated recycle feed stream and process gas at inlets from the feed conduct into the transition area between the first and second reforming reaction zones.

By the process, reformer and reformer tube of the invention, the reforming of the first feed stream comprising a hydrocarbon gas and steam will take place at conditions not leading to carbon formation and the addition of preheated recycled gas from the reducing gas plant will enable production of a low $H_2/CO$ ratio gas.

The present invention describes that steam (water) is added to a hydrocarbon feed stream, typically natural gas, in order to enable steam reforming thereof. In a reducing gas plant, the recycle gas from the metal reduction furnace of the reducing gas plant contains water. Therefore, water should be removed from this recycle gas stream and should be added to the first feed stream prior to the steam reforming of this stream. Some steam may be left in the recycle feed stream, viz. the second feed stream, in order to enable preheating of this stream prior to mixing it with the steam reformed process gas within the first reforming reaction zone of the reformer tube. However, in order to obtain low $H_2/CO$ ratios, it is preferable that the amount of water kept in the recycle feed stream is minimized.

The reducing gas recycle stream typically comprises at least 50 dry mol % $CO_2$ and one or more of the following: steam, methane, hydrogen, carbon monoxide, hydrogen sulfide, sulfur dioxide, nitrogen, and argon.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the scope of the general inventive concept.

To summarize, the invention relates to a chemical reactor and reformer tubes for reforming a first feed stream comprising a hydrocarbon gas and steam. The chemical reactor comprises a shell with a heat source and one or more reformer tubes. The reformer tube is arranged to house catalyst material and is arranged to being heated by the heat source. The reformer tube comprises a first inlet for feeding the first feed stream into a first reforming reaction zone of the reformer tube, and a feed conduct arranged to allow a second feed stream into a second reforming reaction zone of the reformer tube. The second reforming reaction zone is positioned downstream of the first reforming reaction zone. The invention also relates to a process of producing CO rich synthesis gas at low S/C conditions.

The invention claimed is:

1. A chemical reactor for carrying out reforming of a first feed stream comprising a hydrocarbon gas and steam, said chemical reactor comprising:
   a shell comprising a heat source; and
   a reformer tube having a first end and a second end arranged to house catalyst material, said reformer tube being placed within the shell and being arranged to be heated by said heat source, said reformer tube comprising a first inlet for feeding said first feed stream into a first reforming reaction zone of said reformer tube,
   wherein said reformer tube comprises a feed conduct arranged to conduct a second feed stream in heat exchange contact with said catalyst material housed within said reformer tube and allow said second feed stream into a second reforming reaction zone of said reformer tube, said second reforming reaction zone being positioned downstream of said first reforming reaction zone,
   wherein said feed conduct is configured so that said second feed stream is only in contact with catalyst material in said second reforming reaction zone,
   wherein said feed conduct comprises a first part arranged for conducting said second feed stream in heat exchange contact with catalyst material housed within said reformer tube, and a second part arranged for inletting said second feed stream into said second reforming reaction zone of said reformer tube, and
   wherein said second part comprises second inlet(s) at more than one point along a longitudinal axis of said reformer tube and/or a frit material extending along at least a part of the longitudinal axis for letting said second feed stream be released into said second reforming reaction zone along at least a part of the longitudinal axis of the reformer tube housing said feed conduct.

2. The chemical reactor according claim 1, wherein said feed conduct extends into said second reforming reaction zone and said feed conduct comprises a baffle arranged to conduct said second feed stream in heat exchange contact with at least a part of said second reforming reaction zone prior to allowing said second feed stream into said second reforming reaction zone via said second part.

3. The chemical reactor according to claim 1, wherein said feed conduct extends within said reformer tube from either the first or the second end of said reformer tube to said second reforming reaction zone.

4. The chemical reactor according to claim 1, wherein the heat source is able to heat the catalyst material within the reformer tube to a temperature of at least 750° C.

5. The chemical reactor according to claim 1, wherein said feed conduct is of a material which is able to withstand temperatures at least up to 850° C.

6. The chemical reactor according to claim 1, further comprising heat exchange means for heating said second feed stream to a temperature of at least 700° C.

7. A plant for reforming of a first feed stream comprising a hydrocarbon gas and steam, said plant comprising a chemical reactor according to claim 1, said chemical reactor being arranged to receive a first feed stream and a second feed stream and to output a first product gas and further comprising:
   an addition point for addition of a third feed stream to the first product gas to a mixed gas; and
   an adiabatic reactor comprising a second catalyst material, said adiabatic reactor being arranged to receive the mixed gas and equilibrating reverse water gas shift reaction for the mixed gas to provide a second product gas having a lower $H_2/CO$ ratio than the first product gas.

* * * * *